Feb. 11, 1969 T. M. MORRIS 3,427,237

ELECTROLYSIS METHOD AND ELECTROLYTIC CELL

Filed May 1, 1967 Sheet 1 of 5

INVENTOR
Thomas M. Morris

BY Stevens, Davis, Miller & Mosher
ATTORNEYS

INVENTOR
Thomas M. Morris

BY
Stevens, Davis, Miller & Mosher
ATTORNEYS

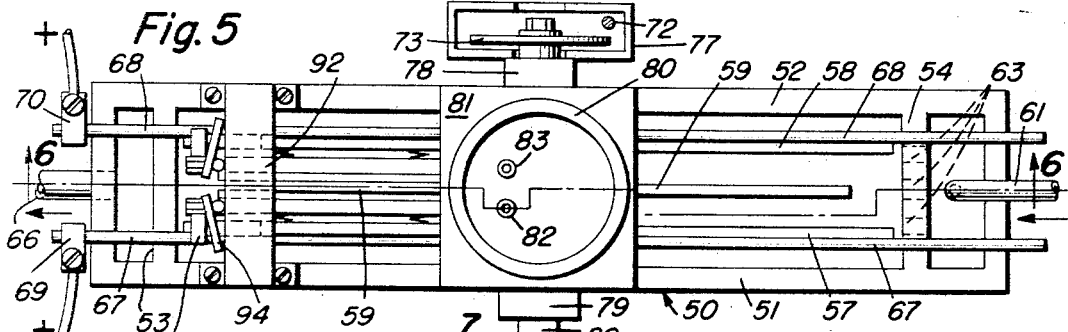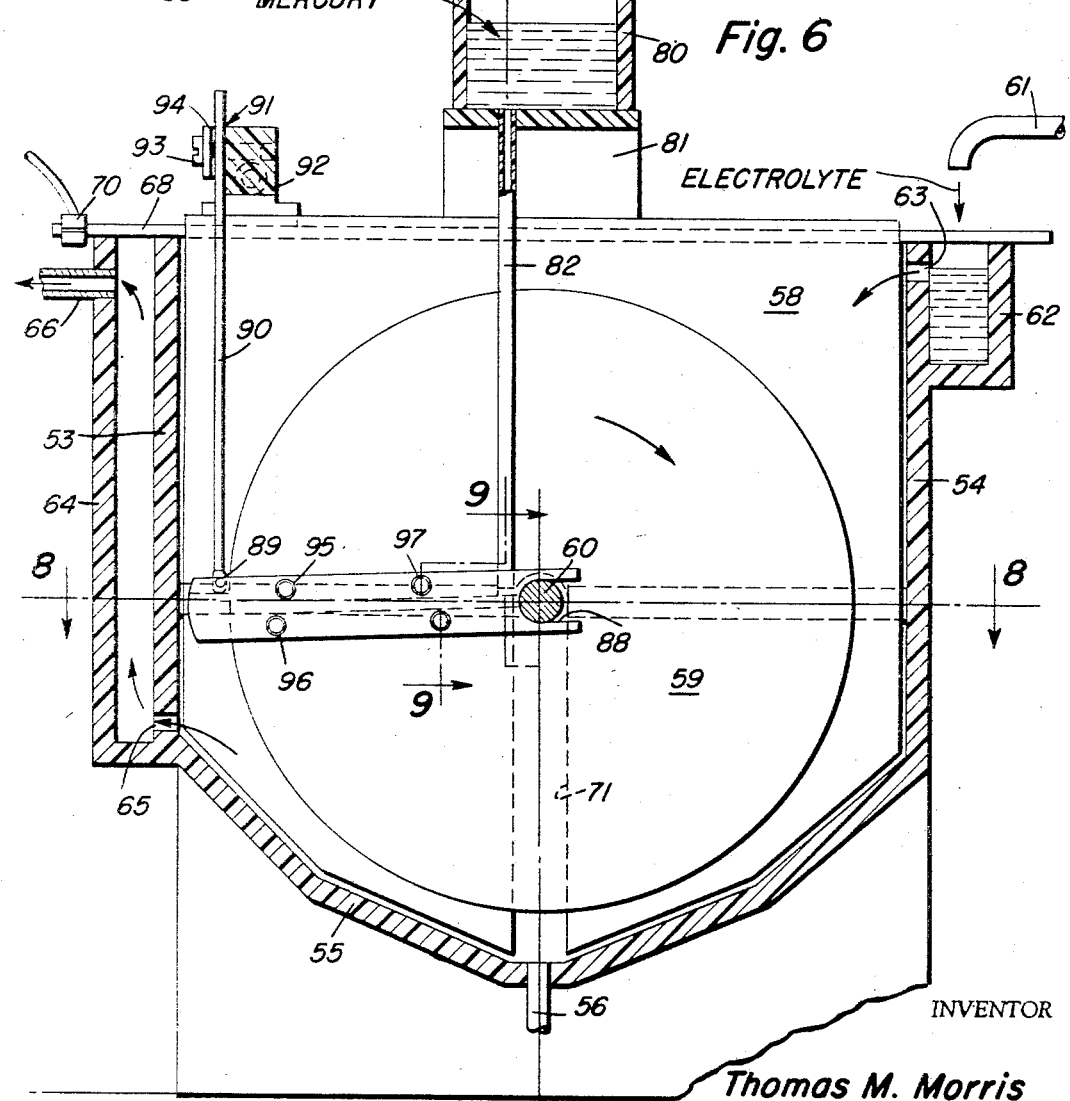

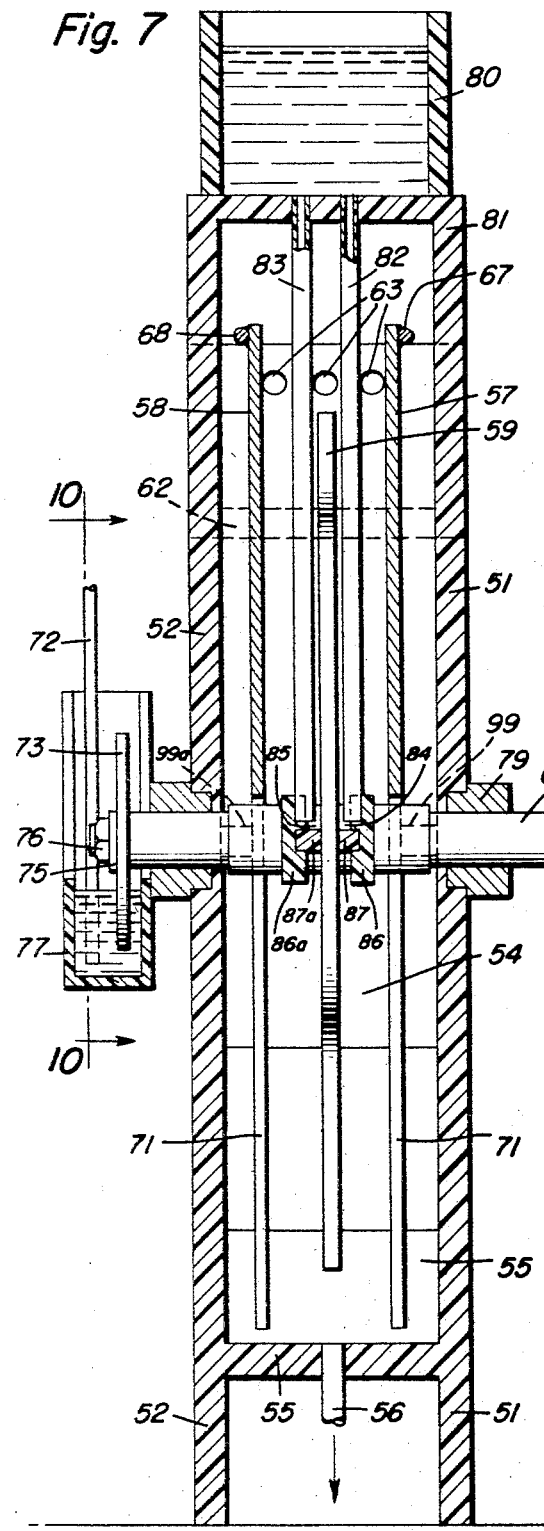
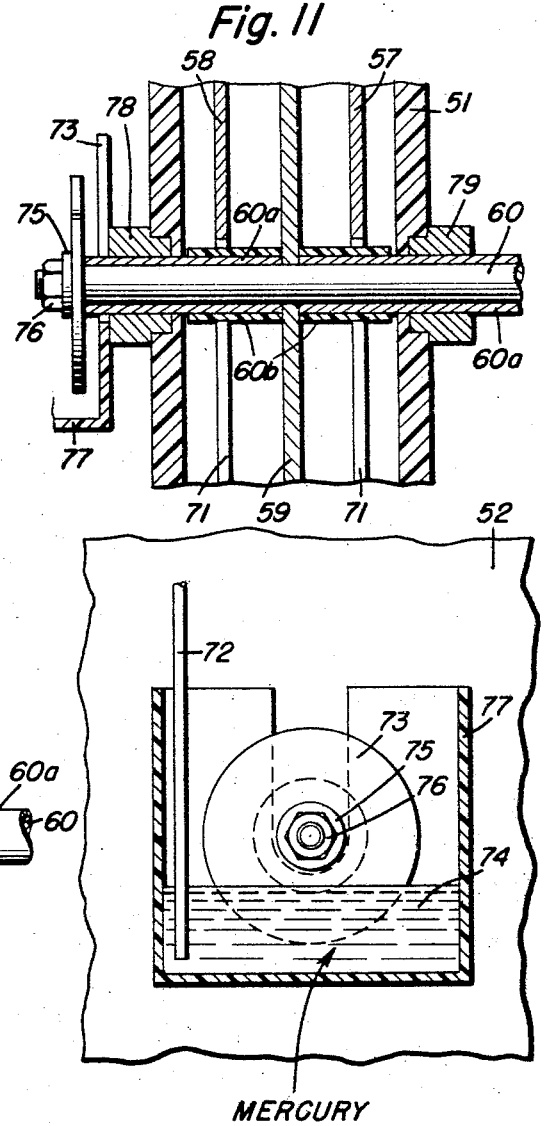
Fig. 7
Fig. 11
Fig. 10
MERCURY
INVENTOR
Thomas M. Morris

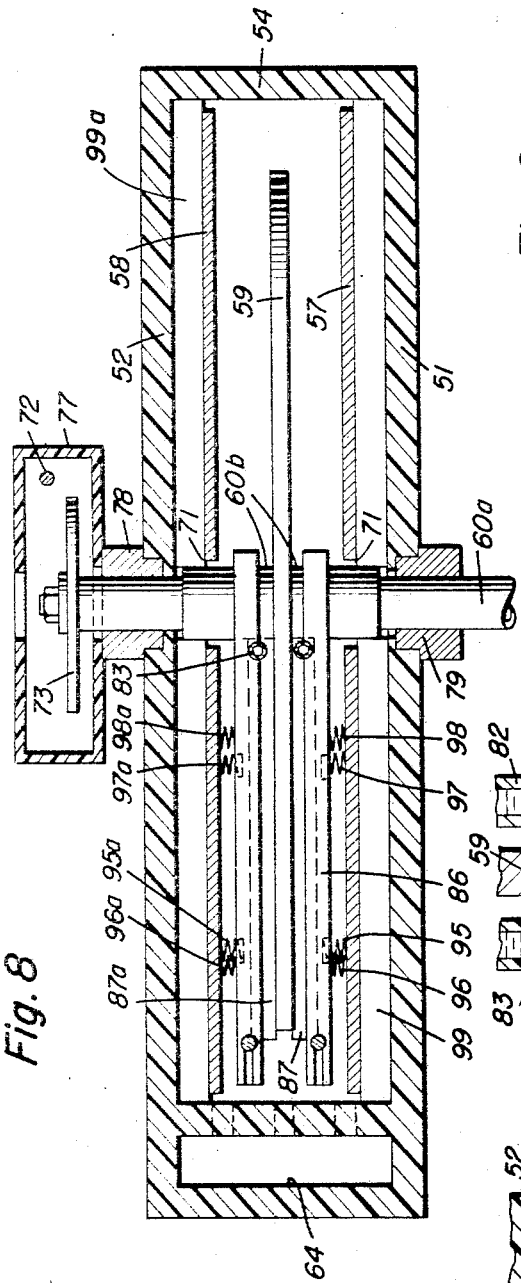
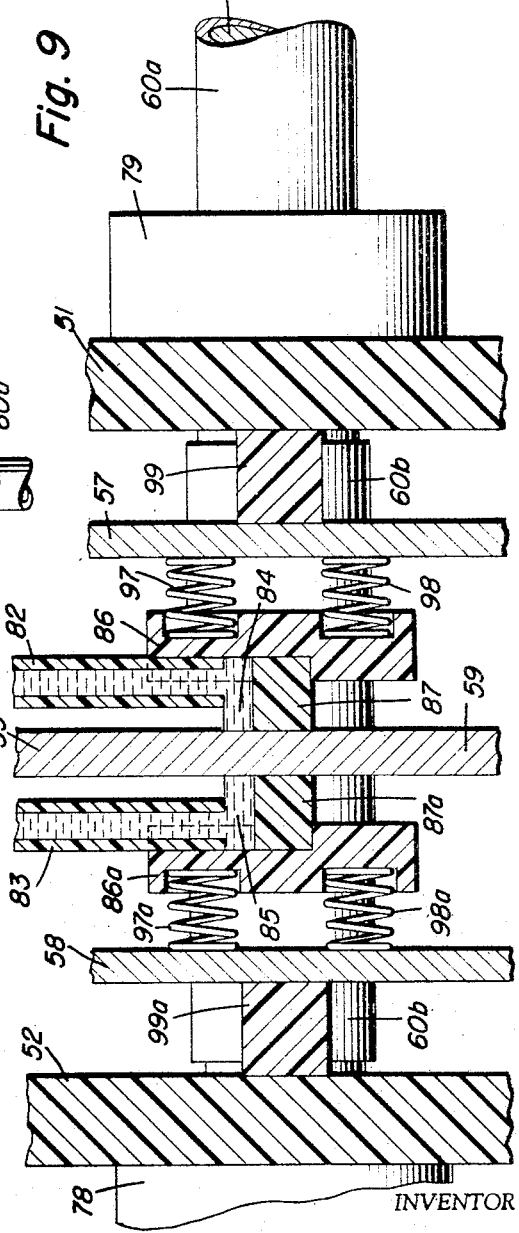

United States Patent Office 3,427,237
Patented Feb. 11, 1969

3,427,237
ELECTROLYSIS METHOD AND
ELECTROLYTIC CELL
Thomas M. Morris, 7131 E. 32nd Place,
Tucson, Ariz. 85710
Continuation-in-part of application Ser. No. 414,597,
Nov. 30, 1964. This application May 1, 1967, Ser.
No. 641,099
U.S. Cl. 204—124      11 Claims
Int. Cl. C22d 1/26, 1/02, 1/00

ABSTRACT OF THE DISCLOSURE

This application discloses a method and apparatus for removing valuable metals from aqueous solutions by electrolytically depositing such metals on a moving mercury cathode and removing mercury enriched by the electrodeposited metal.

---

This application is a continuation-in-part of Ser. No. 414,597 filed Nov. 30, 1964 and now abandoned.

This invention relates to the electrolytic recovery of valuable metals from aqueous solutions resulting from the leaching of metal-bearing materials such as leached waste dumps, oxide deposits and residues from rich-ore recovery.

At the present time recovery of copper from low-grade sources such as waste dumps is effected by flowing the leach liquor as an aqueous solution of a copper salt over a body of waste ferric material, commonly the used "tin" cans, which are, of course, not tin but thin-rolled sheet metal. The iron displaces the copper of the salt with resulting deposition of metallic copper. This reaction is a very slow one and, consequently, requires either a very large surface area of contact or some kind of a recycling of the liquor. Since recycling, involving pumping of the liquor, has been too expensive in the past, resort has been made to very large iron surfaces over which the liquor is flowed. Today, this is becoming increasingly expensive due to the high cost of iron scrap.

Conventional electrolytic recovery of copper is not adaptable to dealing with low concentrations. While commercial electrolysis is satisfactory with concentrations of the order of 24 grams per liter, when the concentration gets below 10 grams per liter, attempts to make conventional systems work result in the production of undesired hydrogen, the creation of a rough and nonadherent cathode surface, as well as the production of undesired values produced from other constituents of the electrolyte. These side effects so affect the efficiency of the process as to render the system commercially unusable when the concentrations of copper are low.

It is therefore an object of the present invention to provide novel methods and apparatuses effective to overcome the disadvantages of both of the foregoing and to provide an economical and efficient system for the electrolytic recovery of metals suitable for the whole range of from relatively rich concentrations to relatively poor concentrations of the same in aqueous solutions.

The present invention is characterized by low energy requirements per unit weight of metal recovered and by recovery of the metal under conditions where getting it into ingot form is easy and inexpensive.

Other objects and advantages of the invention will be apparent upon consideration of the following detailed description of several embodiments thereof in conjunction with the annexed drawings wherein:

FIGURE 5 is a view in plan of another embodiment of cell according to the present invention, showing a preferred form of combined mercury applicator and wiper;

FIGURE 6 is a view taken on the line 6—6 of FIGURE 5 and illustrating the cell of FIGURE 5 partially in section and partially in elevation;

FIGURE 7 is a view in vertical section taken on the line 7—7 of FIGURE 6;

FIGURE 8 is a view in section looking down from the line 8—8 of FIGURE 6;

FIGURE 9 is a fragmentary view in section taken on the line 9—9 of FIGURE 6;

FIGURE 10 is a view in section taken on the line 10—10 of FIGURE 7 and illustrating the electrical connections to the cathode; and FIGURE 11 is a fragmentary view showing further details of the electrical connections to the cathode.

Before discussing the drawings in greater detail, it is well to point out that in commercial electrolytic cells it is common to gang the cathodes so that a large number of them are disposed in the same chamber and are simultaneously exposed to the same electrolyte. They are arranged parallel to each other and to the intermediate anodes, and the anodes and cathodes of the same cell are, of course, connected in parallel to a common source of potential. While the present invention is susceptible of illustration with but a single set of electrodes and the drawings have been prepared with that in mind, it must be understood that in a commercial operation the electrodes of the present invention would be grouped so that a large number of anodes and cathodes would operate in a common electrolyte.

Figure 1:
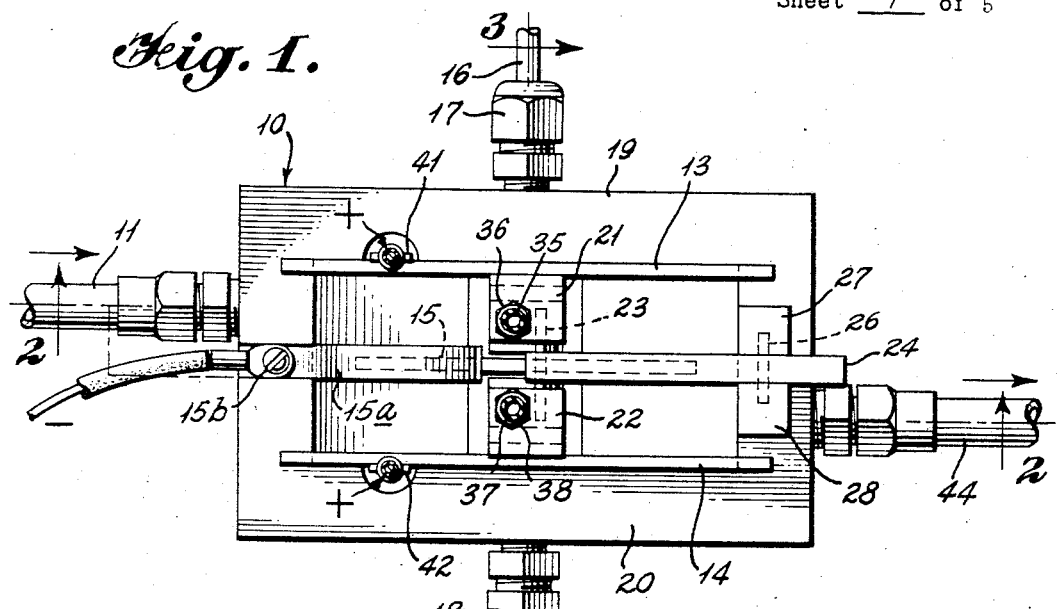
FIGURE 1 is a top plan view of an electrolytic cell constructed and arranged in accordance with the principles of the present invention.
Figure 2:
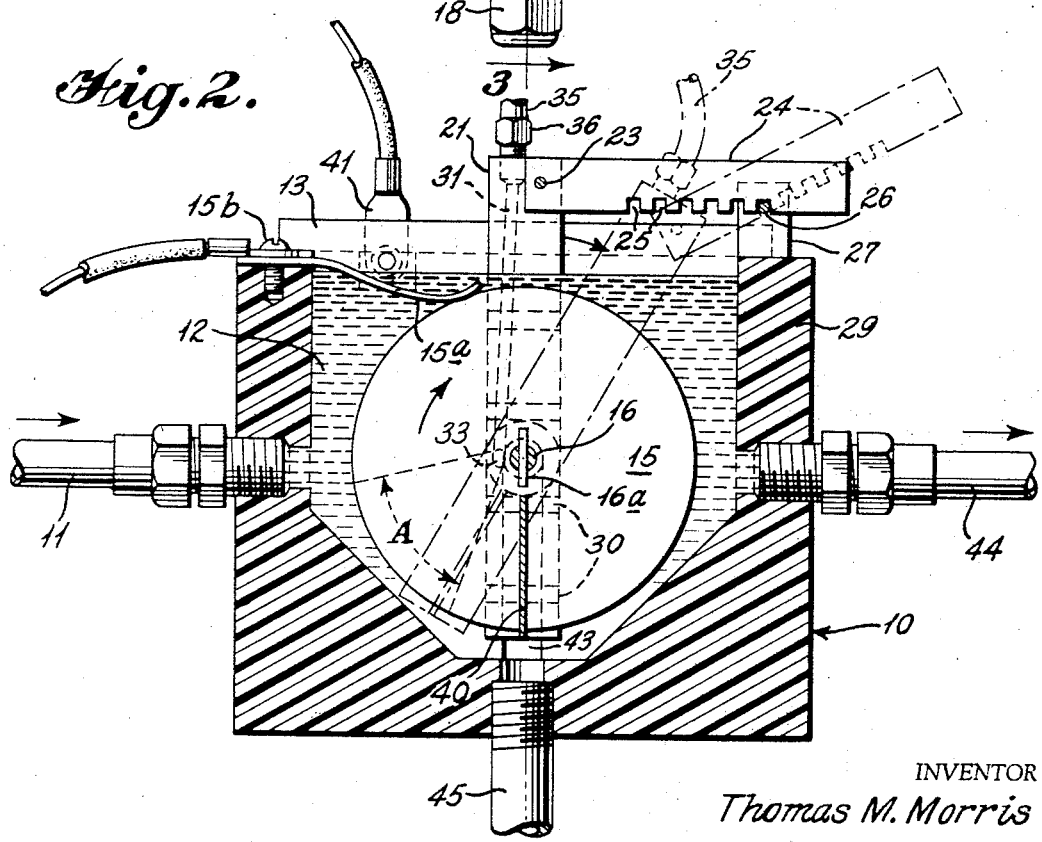
FIGURE 2 is a view in section taken on the line 2—2 of FIGURE 1.
Figure 3:
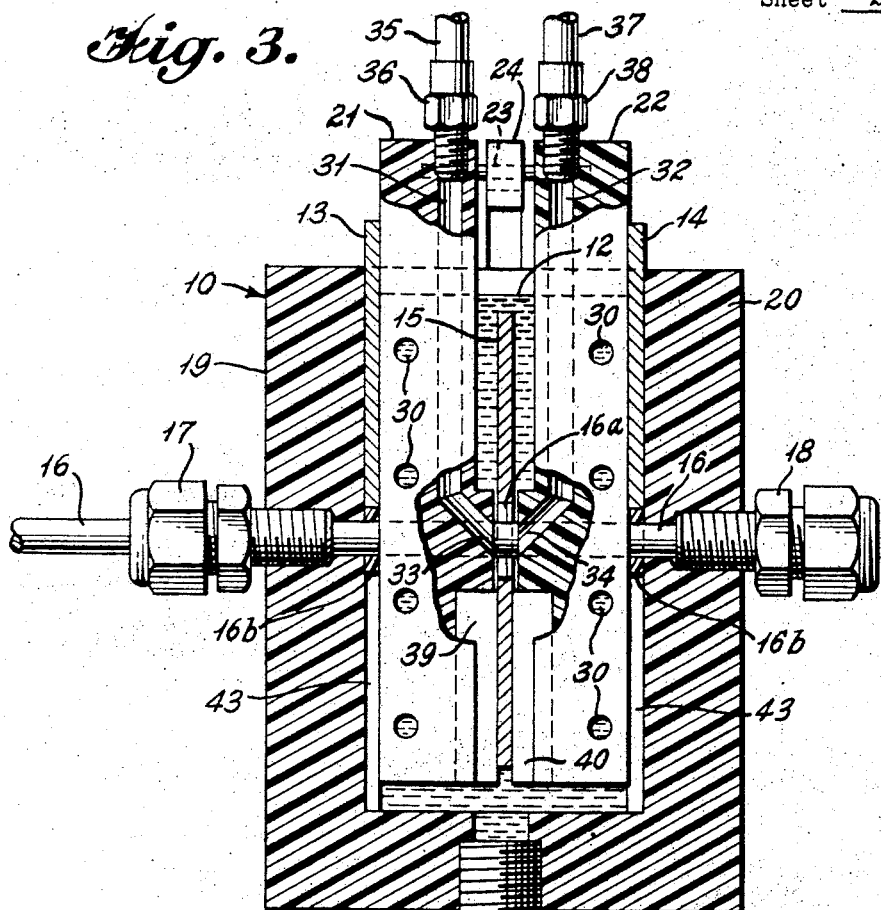
FIGURE 3 is a view in section taken on the line 3—3 of FIGURE 1.
Figure 4:
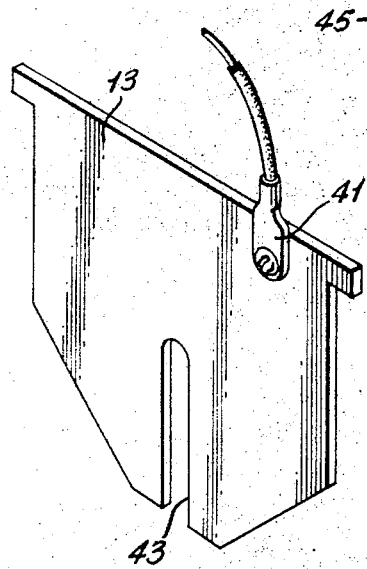
FIGURE 4 is a perspective view of a single anode detached from the cell of FIGURE 1 to show the provision for straddling the shaft which rotates the cathode.

FIGURES 1, 2 and 3 are different views of a single cell constructed in accordance with the principles of the present invention. The cell includes a container 10 which is supplied with electrolyte 12 by a conduit 11; see FIGURE 2. Within the container 10 there are disposed two lead anodes 13 and 14, only one of which shows in FIGURE 2. Centrally located between these two anodes and spaced from both of them is a disc cathode 15 of mercury-coated copper connected by a key 16a to a shaft 16 for rotation therewith. The shaft 16 is mounted in bearings 17 and 18 located in opposite side walls 19 and 20 of the container 10. It is driven by any suitable means, not shown, to cause the cathode 15 to rotate within the electrolyte at a slow speed, i.e., about 20 r.p.m. for a cathode of 3½ inch diameter. The speed of rotation is not so great as to prevent proper coating of the cathode with mercury and is not so low as to permit the formation of too thick a deposit of copper.

The cathode 15 is straddled by a fork-like structure comprised of two tines 21 and 22 interconnected at the respective upper ends by a short shaft 23 on which is pivoted a link 24. The link 24 has spaced notches 25 in its underside which can selectively engage short shaft or pin 26 extending between two blocks 27 and 28 which stand above the end wall 29 of the cell container 10.

The tines 21 and 22 are mounted to rotate relative to the shaft 16, and it can be seen that the angular disposition of these tines is subject to limited adjustment by selecting the particular notch 25 on link 24 in which to engage pin 26. In FIGURE 2 the tines 21 and 22 are shown in the most advanced position of counterclockwise movement. If link 24 is drawn to the right of the FIGURE 2 position, the tines may be displaced clockwise as far as the broken line position of FIGURE 2. The engagement of the pin 26 in a notch 25 locks the tines 21 and 22 against rotation or angular movement caused by the movement of the shaft 16.

The tines 21 and 22 are roughly square in cross section and lie in the space between the anodes and the cathode. So as not to impair circulation of the electrolyte 12 the tines have passages through them at 30; see and compare FIGURES 2 and 3.

The tines 21 and 22 are provided with longitudinally extending passageways 31 and 32, respectively. If reference is made to FIGURE 3, it will be seen that the passageway 31 extends from the top of the tine 21 just about to where the tine is pivotally mounted over the shaft 16, and there it connects with a port 33 which discharges onto the left-hand surface of the disc 15. Passageway 32 similarly connects with a channel 34 which discharges on the opposite face of the disc 15 in alignment with the mouth of port 33.

The disposition of the ports 33 and 34 is of very considerable importance to the form of the present invention illustrated in FIGURES 1 to 4, inclusive, since it is through these ports that mercury is supplied to the cathode 15. In a preferred form of the invention the cathode 15 is made of copper. Mercury is supplied to the passageway 31 through suitable tubing 35 and a fitting 36. Mercury is also supplied to the passageway 32 through tubing 37 and a fitting 38. Mercury is flowed onto opposite sides of the cathode 15 about at the horizontal center line of the cathode just a little left of the vertical center line of the cathode as it is shown in FIGURE 2. The cathode 15 is rotated in a clockwise direction as viewed in FIGURE 2 so that the mercury flowing onto its opposite sides from the ports 33 and 34 spreads over the surface of the cathode forming a relatively smooth, even and complete coating due to the dropwise, continuous delivery of mercury. This coating, which is initially formed in the sector marked A and defined by the broken lines of FIGURE 2, maintains its integrity through nearly 360° of angular displacement until it arrives at wiper blades 39 and 40 which, in the form of the invention illustrated in FIGURES 1 to 4, inclusive, may be stainless steel. The blade 39 is imbedded in the lower inside face of the tine 21 and the blade 40 is similarly imbedded in the tine 22. These two blades are in wiping relation to the opposite faces of the cathode disc 15 in the position of the lower vertical radius or a position inclined thereto as permitted by the adjustment of the particular notch 25 engaging pin 26; see FIGURE 2.

Each cathode 15 is connected in the electric circuit by a brush 15a bearing on the periphery of the cathode and having a binding post 15b mounted on the top edge of the cell wall; see FIGURES 1 and 2. In circumstances where the total current load is not too great for it to carry, the shaft 16 may be connected to the negative pole of an appropriate D.C. source of potential. This shaft 16 through pin 16a connects to the cathode 15. Of course, copper, the base material of the cathode, is a good conductor, and mercury wets copper well, so that the mercury film is an excellent electrical contact with the base, as well as providing a smooth surface to the electrolyte. The electrical connections to the shaft 16 are not shown, but conventional equipment for supplying electrical current to a rotating shaft may be used. The anodes must, of course, be electrically insulated from the shaft 16, and to this end they are both made in the same configuration which can be appreciated upon reference to FIGURE 4, which is a perspective view of anode 13. The anodes are provided with binding posts or other electrical connections such as those shown at 41 and 42. The anodes are made with a cutout slot at 43, and this slot is so designed as to straddle the shaft 16. Plastic collars 16b surround the shaft 16 at the regions of proximity to the anodes so as to prevent the production of a short current path from the anode to the cathode drive shaft. The anodes are held in position by appropriate slots in the casing 10 of the cell. The anodes 13 and 14 are made of lead when the cathode 15 is mercury-covered copper and when the cell is used to recover copper values from the electrolyte.

It has been stated that the electrolyte is supplied into the cell through a conduit 11. The electrolyte leaves the cell through a conduit 44, and it is to be understood that both of the conduits 11 and 44 may be provided with valves. Extending from the bottom of the cell 10 is a conduit 45 which lies directly under the blades 39 and 40.

Now that the structure of a single cell has been explained, the operation will be apparent. Let it be assumed that the electrolyte is an aqueous solution of $CuSO_4$ having a concentration of 5 grams of copper per liter. A potential of 3.5 volts is established between anode and cathode which results in a current density of 30 amp. per square foot. Copper ions migrate to the cathode and are deposited on the mercury coating on the cathode. Once every 360° of rotation the mercury coating is wiped off the cathode 15 by the blades 39 and 40, and this coating, with the copper in it, flows to the bottom of the cell from which it can be withdrawn through a conduit 45. In the rotation of the cathode 15, it moves away from blades 39 and 40 immediately to ports 33 and 34, which recoat the cathode with mercury. Thus, the mercury film is continuously removed and continuously replaced, so that it is always present in the clockwise sector extending between the ports 33 and 34 and the blades 39 and 40 and absent only in the very narrow anticlockwise sector between said ports and said blades, although a mercury coating is always present on all parts of the cathode disc 15.

Mercury has a very high hydrogen overvoltage. This means that the voltage necessary to generate hydrogen at the cathode is much above the theoretical zero of the EMF series table. Accordingly, with the cathode of the present invention, it is possible to recover metals as high in the EMF series as zinc without serious losses due to hydrogen generation.

By reason of the fact that the mercury and the recovered metal from the electrolyte deposited therein are scraped or wiped off each 360° of movement of the cathode, it is possible to place the anode and cathode very close together, which is an economic advantage because the cell volume can be smaller. The result of this compactness is that no portion of the electrolyte is remote from a cathode, and so the ions readily migrate to the cathode where they are reduced. Since the high hydrogen overvoltage which mercury has is related to the smoothness of the cathode surface, the present invention contemplates starting with a cathode which has been precoated with mercury. The deposit of copper is removed every 360° of movement of the cathode, so that a relatively smooth film is continuously maintained and high hydrogen overvoltage is maintained, while sandy effects resulting from the deposit of copper in the mercury are avoided at the mercury surface of the cathode.

The rotation of the cathode has the effect of agitating the electrolyte which promotes the reaction. The continuous introduction of mercury also has a heat exchange effect since the cool, incoming mercury can absorb heat from the electrolyte and this heat is partially abstracted when the copper-mercury recovery product flows out of the tube at 45.

In the recovery of copper the cells may be cascaded, in which case the electrolyte leaving a first cell, such as that shown in FIGURE 1, would pass into another like cell where further copper would be removed from said solution. As the concentration of copper decreases, in general, the current density on the cathode must decease. Hence, each tank or group of tanks in a series should be operated at a lower current density than the tank or group of tanks before it.

Mercury leaving the cell through conduit 45 goes to a settler, then to an evaporator, and finally to a melting and casting unit. The copper forms in the mercury as a dispersion. This dispersion and the mercury are scraped off, and in the settling chamber most of the copper floats to the surface. This float will contain 5 to 10% by weight of copper. The depleted mercury is removed continuously from the bottom of the settling chamber and recycled to the cells. The float will flow to an evaporator where the mercury and copper are separated by boiling off the mercury. The mercury vapor is condensed and returned to the electrolytic cell. The copper is removed from the evaporator as a sponge which is melted and cast into ingots, or the copper can be sized so as to make it suitable for use as a copper powder.

The cell illustrated in FIGURES 5 to 11, inclusive, is comprised of a container 50 made of electrically nonconductive material. The container 50 has side walls 51 and 52, end walls 53 and 54, and a bottom wall 55 which slopes downwardly from both end walls 53 and 54 to a central drain tube 56. Mounted within the container 50 are two stationary lead anodes 57 and 58 and a rotatable copper cathode 59 fixed to a stainless steel shaft 60 which is rotated by means not shown.

In the apparatus of FIGURES 5 to 11, inclusive, the copper-containing electrolyte is delivered to the cell by a conduit 61 which discharges into a small compartment 62 projecting outwardly from wall 54 near the top of container 50. The wall 54 is provided with ports at 63 through which the electrolyte spills into the container 50. Another small compartment 64 extends outwardly from and is vertically coextensive with end wall 53. Ports 65 passing through wall 53 near bottom wall 55 establish electrolyte passageways between container 50 and the interior of container 64. Container 64 has a discharge port at 66. The location of ports 63 and 65 is such as to cause the electrolyte flowing through the cell to take a generally diagonal course from upper right to lower left, as viewed in FIGURE 6, thereby causing a well-distributed flow between anodes and cathodes.

The electrical connections to the anodes 57 and 58 are bus rods 67 and 68 each welded to the respective anode near the upper edge thereof. The bus rods 67 and 68 bridge across the top of the container 50 and so serve to support the respective anode suspended in the electrolyte in a vertical plane parallel to the other anode, the cathode, and the side walls 51 and 52 of the container. Current leads to the bus rods 67 and 68 are provided at 69 and 70; see FIGURES 5 and 6. Note that the anodes 57 and 58 are cut away at 71 to straddle the shaft 60 without electrical contact. The cathode 59 is supplied with current by a bus rod 72. The bus rod 72 has one end immersed in a pool 74 of mercury, and also immersed in that mercury pool is a disc 73 which is connected to the shaft 60 which drives the cathode. The details of the construction are well shown in FIGURES 7, 10 and 11. From those figures it will be seen that shaft 60 is covered with two copper sleeves 60a, one end of each of which bears against the face of the cathode 59. The other end of one of the sleeves 60a bears against the face of the disc 73. The disc 73 is held in that position by a washer 75 and a nut 76 fitting over a threaded end of shaft 60. The pool of mercury 74 is maintained in a little container 77 supported from shaft bearing 78. Shaft 60 and the surrounding sleeve 60a together as a unit turn in the bearing 78 which is supported from side wall 52 of container 50 and in a similar bearing 79 which is supported from side wall 51. As illustrated, the whole of container 50 is made of insulating, nonconductive plastic material so that bearings 78 and 79 may be metal, if desired, without danger of short-circuiting the system. A plastic sleeve 60b surrounds each copper sleeve 60a for the portion of its length that lies between the cathode 59 and bearings 78 and 79. The sleeve 60b serves to insulate the cathode current supply from the straddling anodes 57 and 58.

Although in a single-cathode cell as shown in FIGURES 5 to 11, inclusive, there is no reason for the copper sleeve 60a, which is shown as extending from the right face of cathode 59 through the bearing 79, as viewed in FIGURE 7, this has been included because, in a ganged construction, copper sleeves will extend between the cathodes to carry the current to all of them from a single supply such as the mercury pool 74 or the like.

An important use of the invention of FIGURES 5 to 11, inclusive, is to electrodeposit copper on mercury, coating the cathode 59. This film of mercury is maintained for just about 360° of rotation of the cathode and then is removed and replaced by a new film. The apparatus by which this is done is well shown in FIGURES 7, 8 and 9 of the drawings. A supply of mercury is maintained in a reservoir 80 which is supported vertically above the shaft 60 by a plastic bridge 81 which straddles container 50 from wall 51 to wall 52; see FIGURE 7. Descending from reservoir 80 and passing through bridge 81 are two flexible tubes 82 and 83 through which mercury is delivered to stationary, radial channels or troughs 84 and 85 on opposite sides of cathode 59.

The channel 84 is defined by a radially disposed plastic bar 86 which supports a Teflon strip 87 in wiping relation to the right-hand surface of cathode 59 as it is viewed in FIGURE 7. Teflon is a trademark used to designate polytetrafluoroethylene. Upon reference to FIGURE 6, it will be seen that the bar 86 is forked at 88 and so straddles the shaft 60. Thus, shaft 60 acts as a support for the right-hand end of bar 86 as it is viewed in FIGURE 6. The left-hand end of bar 86, again as viewed in FIGURE 6, is pivotally pinned at 89 to a stainless steel rod 90 that can be moved up and down to modify the slope of the bar 86. To this end rod 90 passes through a clamp 91 supported from a plastic bridge 92 extending across the top of container 50 between side walls 51 and 52. While the clamp 91 may be of any firm-holding, quick-releasing type, the illustrated form includes a screw 93 threaded into the bridge 92 and a clamping piece 94 which can be held by the screw tight against rod 90 to hold the same in a selected position of adjustment.

The bar 86 is provided with four cavities in the face opposite to the one which holds the Teflon wiper 87, and stainless steel coil springs 95, 96, 97 and 98 extend in compression from these cavities to the surface of anode 57, thus providing a spring bias causing Teflon wiper 87 to bear gently but evenly against the surface of the cathode 59. A plastic bar 99 extends between side wall 51 of container 50 and the face of anode 57 opposite to the one against which springs 95, 96, 97 and 98 bear. The bar 99 keeps the springs from displacing the anode.

The channel 85 is defined by structural parts exactly the same in structure and function as those which define the channel 84, and they are designated by the same reference numerals with the distinguishing subscript *a*.

When the form of the invention shown in FIGURES 5 to 11, inclusive, is put into operation, the electrolyte is flowed from upper right to lower left of the cell as viewed in FIGURE 6. This flow pattern insures that the electrolyte flows past the cathode 59. The cathode rotates clockwise as viewed in FIGURE 6. Mercury flows by gravity from container 80 through the tubes 82 and 83 to troughs 84 and 85, respectively. It flows along these troughs which are formed by the wiper bars 86, 86a, the Teflon inserts 87, 87a and the surface of the cathode itself. The trough assembly is tilted down from the horizontal very slightly as can be seen in FIGURE 6, and this allows the stream of mercury to flow along the length of the troughs 84 and 85 moving radially outwardly in the direction of the periphery of the disc 59. As the disc 59 rotates, it continuously replaces the radial portion which forms a part of the trough and so becomes coated with a film of mercury.

Enough mercury is fed to the troughs 84 and 85 so that an excess spills over the radially outer end of the Teflon strips 87, 87a. The feed rate of the mercury depends upon the speed of the cathode disc; the faster the speed of the disc the greater must be the feed rate of the mercury. Also, the disc 59 must rotate fast enough to carry the film of mercury past the vertical, for otherwise, a drainage of the mercury due to gravity might cause the film of mercury to be too thin. The rotation of the disc allows operation at higher current density for a given solution compared to a stationary cathode. When the cathode 59 rotates past the underside of the Teflon wipers 87, 87a, the amalgam is forced to flow down the disc 59 and through the drain conduit 56 at the bottom of the container 50. The amalgam is filtered and the filtrate is returned to the mercury feed reservoir 80. The filter "cake" is sent to an evaporator in order to boil off the mercury. The mercury is then condensed and returned to the reservoir 80 while copper sponge or powder is obtained from the evaporator.

While the form of the invention illustrated in FIGURES 1 to 4 has been described in connection with wipers of stainless steel, testing has revealed that the wiping action need not be effected with a stiff, rigid material such as steel, but may be effected most efficiently with a plastic material such as Teflon. In the laboratory the technicians have referred to the amalgam which is removed by the scraper or wiper as "butter," and this indeed is an apt term, since the behavior of the product is very much like that of soft butter.

What is claimed is:

1. The method of recovering a metal from an electrolyte containing the same that comprises maintaining a smooth, mercury surface on a cathode a substantial area, including the bottom of which, is continuously immersed in said electrolyte, said mercury surface being maintained by continuously, sequentially applying mercury to and removing it from succeeding portions of said cathode and depositing metal on said maintained mercury surface.

2. The method of recovering a metal from an electrolyte containing the same that comprises maintaining a smooth, mercury surface on a cathode immersed in said electrolyte, sequentially rotating said cathode through a mercury application station and a mercury removal station with a sector of substantial angular dimension therebetween and depositing the desired metal on said mercury in said sector between said stations while maintaining the bottom edge of said cathode in constant contact with said electrolyte.

3. The method of claim 2 wherein the cathode is copper.

4. The method of claim 2 wherein said mercury removal station is a wiping station.

5. The method of recovering a metal higher than hydrogen in the electromotive force series from an aqueous electrolyte containing the same that comprises maintaining a smooth, thin, clean and evenly distributed mercury surface on a cathode having a substantial area, including its bottom edge, continuously immersed in said electrolyte, said mercury surface being maintained by continuously applying mercury to and recovering it from succeeding portions of said cathode while depositing said metal on said mercury substantially free of hydrogen at the cathode.

6. The method of claim 5 wherein the metal deposited on the mercury is zinc.

7. In an electrolytic cell, an electrode presenting a flat surface, a mercury applicator including a mercury discharge region contiguous to a flat surface of said electrode, a mercury reservoir above said applicator to feed mercury thereto by gravity, a wiper for removing mercury from said surface, means to move said surface relative to said applicator and wiper to cause the same sequentially to coat and wipe said surface, the locations of said applicator and wiper and the direction of relative movement being such as to cause the wiping to occur immediately before the application so that most of said electrode surface is coated with unwiped mercury at all times.

8. In an electrolytic cell, a flat, disc-shaped electrode, means mounting said electrode for rotation in a vertical plane, means to apply mercury to said electrode in a radius of its path of rotation, said mercury application means including a mercury discharge region contiguous to a flat surface of said electrode, a mercury reservoir above said applicator to feed mercury thereto by gravity and a conduit vertically below said electrode to receive mercury falling from said disc.

9. In an electrolytic cell, a flat, disc-shaped electrode, means to apply mercury to said electrode, said mercury application means including a mercury discharge region contiguous to a flat surface of said electrode, a mercury reservoir above said applicator to feed mercury thereto by gravity, means to remove mercury from said electrode, means mounting said electrode and said application and removal means for relative rotation, said application and removal means being radially located adjacent and parallel in the path of relative rotation and means relatively to rotate said electrode and said application and removal means in a direction from the mercury application means to the mercury removal means, the angular separation of said application and removal means being nearly 360° in the direction of relative rotation.

10. In an electrolytic cell, a flat, disc-shaped electrode, means mounting said electrode for rotation in a vertical plane, means defining with a flat surface of said electrode a trough extending generally radially across said surface of said electrode, a flexible wiper constituting a part of said trough defining means, means resiliently biasing said wiper against the surface of said electrode and means to supply mercury to said trough.

11. In an electrolytic cell as claimed in claim 10, means mounting said trough for angular adjustment from the horizontal so that mercury flow therealong may be modified by the effect of gravity.

References Cited

UNITED STATES PATENTS

| | | | |
|---|---|---|---|
| 473,104 | 4/1892 | Atkins | 204—220 XR |
| 699,415 | 5/1902 | Reed | 204—220 XR |
| 1,115,513 | 11/1914 | Dennis | 204—221 XR |
| 1,959,376 | 5/1934 | Lucas | 204—10 |
| 2,323,042 | 6/1943 | Honsberg | 204—220 XR |
| 2,234,967 | 3/1941 | Gilbert | 204—220 XR |
| 2,810,682 | 10/1957 | Brown | 204—10 |
| 3,002,898 | 10/1961 | Jarvis | 204—220 XR |

ROBERT K. MIHALEK, *Primary Examiner.*

W. VAN SISE, *Assistant Examiner.*

U.S. Cl. X.R.

204—219, 215, 221, 10, 220, 212, 250, 235, 240, 275, 105, 106; 209—174, 179